United States Patent
Truuvert

(10) Patent No.: US 6,408,993 B1
(45) Date of Patent: Jun. 25, 2002

(54) CONTROL ARRANGEMENT FOR A BRAKE LEVER

(75) Inventor: Jaan Truuvert, Kävlinge (SE)

(73) Assignee: Haldex Brake Products AB (SE)

( * ) Notice: Subject to any disclaimer, the term of this patent is extended or adjusted under 35 U.S.C. 154(b) by 0 days.

(21) Appl. No.: 09/671,370

(22) Filed: Sep. 27, 2000

Related U.S. Application Data

(63) Continuation of application No. PCT/SE99/00497, filed on Mar. 29, 1999.

(30) Foreign Application Priority Data

Mar. 27, 1998 (SE) .............................................. 9801052

(51) Int. Cl.[7] .............................................. F16D 65/60
(52) U.S. Cl. .............................. 188/79.55; 188/196 D; 188/196 BA
(58) Field of Search .......................... 788/79.55, 196 D, 788/196 BA

(56) References Cited

U.S. PATENT DOCUMENTS

| | | | | |
|---|---|---|---|---|
| 4,121,703 A | * | 10/1978 | Moss ...................... | 188/79.55 |
| 4,384,638 A | * | 5/1983 | Crissy et al. ............ | 188/79.55 |
| 4,484,665 A | * | 11/1984 | Svensson .................. | 188/79.55 |
| 5,327,999 A | * | 7/1994 | Nelander .................. | 188/79.55 |

FOREIGN PATENT DOCUMENTS

| | | | | |
|---|---|---|---|---|
| EP | 0598290 | * | 11/1993 | ............... 188/79.55 |
| WO | 94/08154 | * | 4/1994 | ............... 188/79.55 |

* cited by examiner

*Primary Examiner*—Matthew C. Graham
(74) *Attorney, Agent, or Firm*—St.Onge Steward Johnston & Reens LLC

(57) ABSTRACT

A brake lever is to be attached to a splined S-cam shaft of an automotive drum brake and to be connected to a brake cylinder push rod. The lever has a control arrangement for transmitting a control movement from a control disc with a reference point to a clutch wheel of the lever mechanism depending on the angular movement of the brake lever. The control disc is in gear engagement with a pinion, and an adjustment screw coaxial with the pinion is in engagement with the clutch wheel. A cylindrical driver is axially but non-rotatably movable in relation to the pinion coaxial therewith and forms a one-way clutch with a unit including the adjustment screw, which is axially movable a distance corresponding to a desired control distance or A-measure for the brake lever, the one-way clutch being spring-biased into engagement.

6 Claims, 3 Drawing Sheets

CONTROL ARRANGEMENT FOR A BRAKE LEVER

This is a continuation of pending International Application PCT/SE99/00497 filed of Mar. 29, 1999, which designates the United States.

TECHNICAL FIELD

The present invention relates to a brake lever for attachment to a splined S-cam shaft of an automotive drum brake and connection to a brake cylinder push rod, including a worm wheel, rotatably mounted in a housing of the brake lever and having internal splines for cooperation with the S-cam shaft, and a worm screw, rotatable in the housing perpendicularly to the worm wheel and meshing therewith, and a control arrangement for transmitting a control movement from a reference point to a clutch wheel, which is rotatable on the worm screw, depending on the angular movement of the brake lever, and which forms a clutch with the worm screw normally held engaged by a strong compression spring, the control arrangement including a control disc, which is rotatable coaxially with the worm wheel and is connected to a control ring having a control arm for establishing the reference point by being attached to a fixed part of a vehicle chassis, a pinion meshing with the toothed periphery of the control disc and an adjustment screw, which is coaxial with the pinion and is in tooth engagement with the clutch wheel, wherein the axis of the worm screw is perpendicular to the axis of the pinion and the adjuster screw.

BACKGROUND ART

A brake lever or slack adjuster of the kind defined above is disclosed in EP-A-598 290. This brake lever has proven its advantages in practical service and is commercially available.

However, in its control arrangement it contains parts that are somewhat awkward to produce and mount. Also, an adjustment of the desired control distance or A-measure is accomplished by exchange of a part in the control arrangement, which means that several such parts have to be kept in stock. It is further desired to have the possibility to increase the spring bias in the control arrangement for safe-guarding the proper function of the device.

The main object of the invention is thus to alter the control arrangement of the brake lever defined above in such a way that it contains a lower number of parts, which can be produced at lower costs and are easier to mount, even with the possibility for an automated mounting.

THE INVENTION

This is according to the invention attained in that a cylindrical driver is axially but non-rotatably movable in relation to the pinion coaxial therewith and forms a one-way clutch with a unit including the adjustment screw, which is axially movable a distance corresponding to a desired control distance or A-measure for the brake lever, the one-way clutch being spring-biassed into engagement.

Preferably, the pinion, the driver, and the unit including the adjustment screw are rotatably arranged on a common shaft.

The pinion may be sleeve-shaped for receiving the driver, and a compression spring may be arranged between the pinion and the driver.

The one-way clutch is preferably formed between the driver and a tooth washer connected to the adjustment screw.

The unit of the tooth washer and the adjustment screw is axially movable on the shaft between a shaft shoulder and a counter-nut attached at the end of the shaft. The control distance or A-measure, defined by this axial play, may accordingly easily be set at the factory by moving the counter-nut on the shaft.

BRIEF DESCRIPTION OF THE DRAWINGS

The invention will be described in further detail below under reference to the accompanying drawings, in which.

DETAILED DESCRIPTION OF A PREFERRED EMBODIMENT

Figure 1:
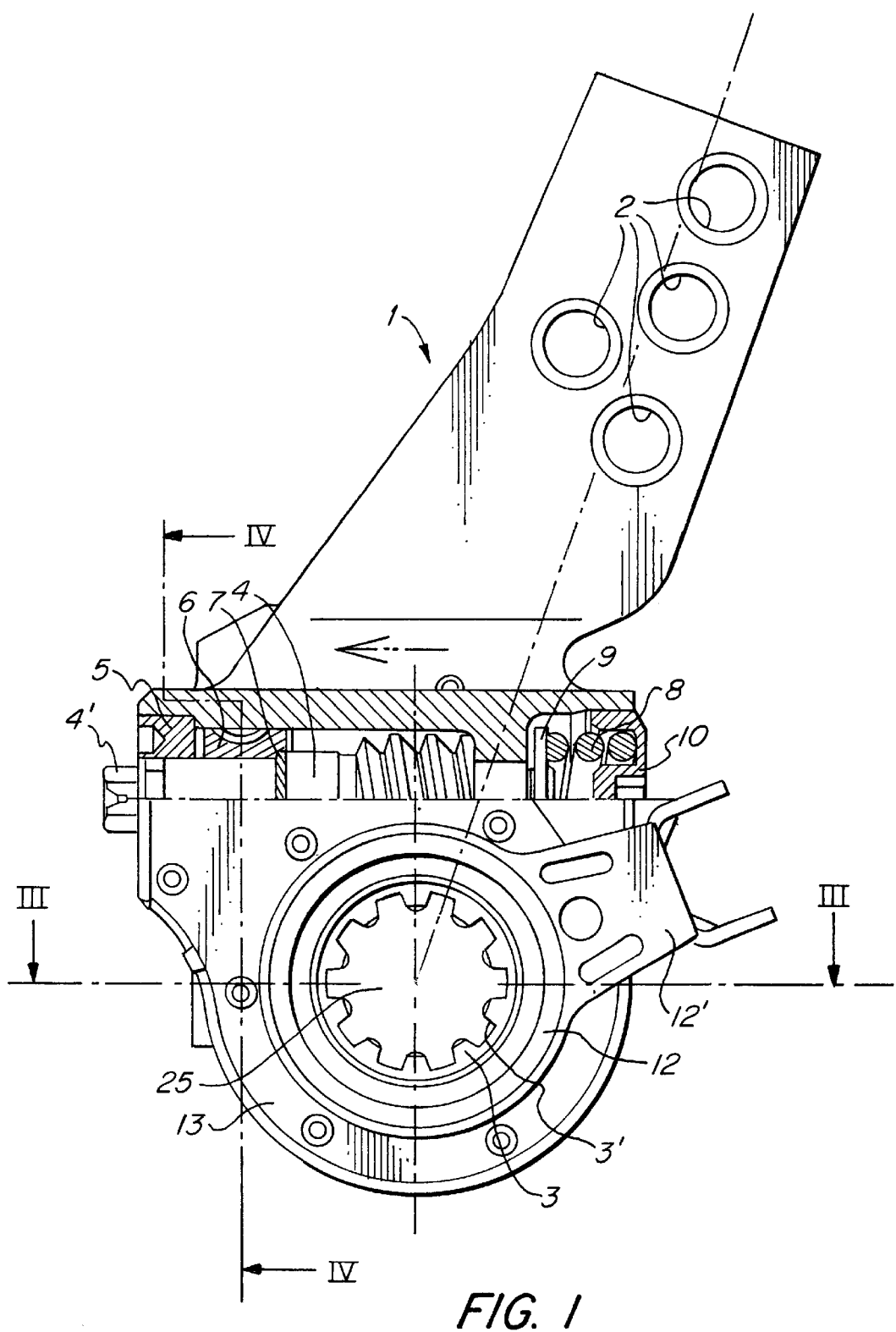
FIG. 1 is a side view, partly in section, of a brake lever according to the invention.

A brake lever of the general type concerned is well known in the art. It constitutes a connection lever in a brake system of a heavy road vehicle between a push rod of a brake cylinder and a splined S-cam shaft of a drum brake arrangement, comprising a brake drum and brake shoes to be pressed apart for braking engagement with the brake drum.

A brake lever housing 1 is at its upper end provided with a number of holes 2, of which one is to be pivotally connected to the brake cylinder push rod (not shown). Towards its opposite end the brake lever is provided with a rotatable worm wheel 3, which has internal splines 3' for attachment to the S-cam shaft (25). Meshing with this worm wheel 3 is a worm screw 4, which is rotatably mounted crosswise in the housing 1.

Figures 2, 3, 4:
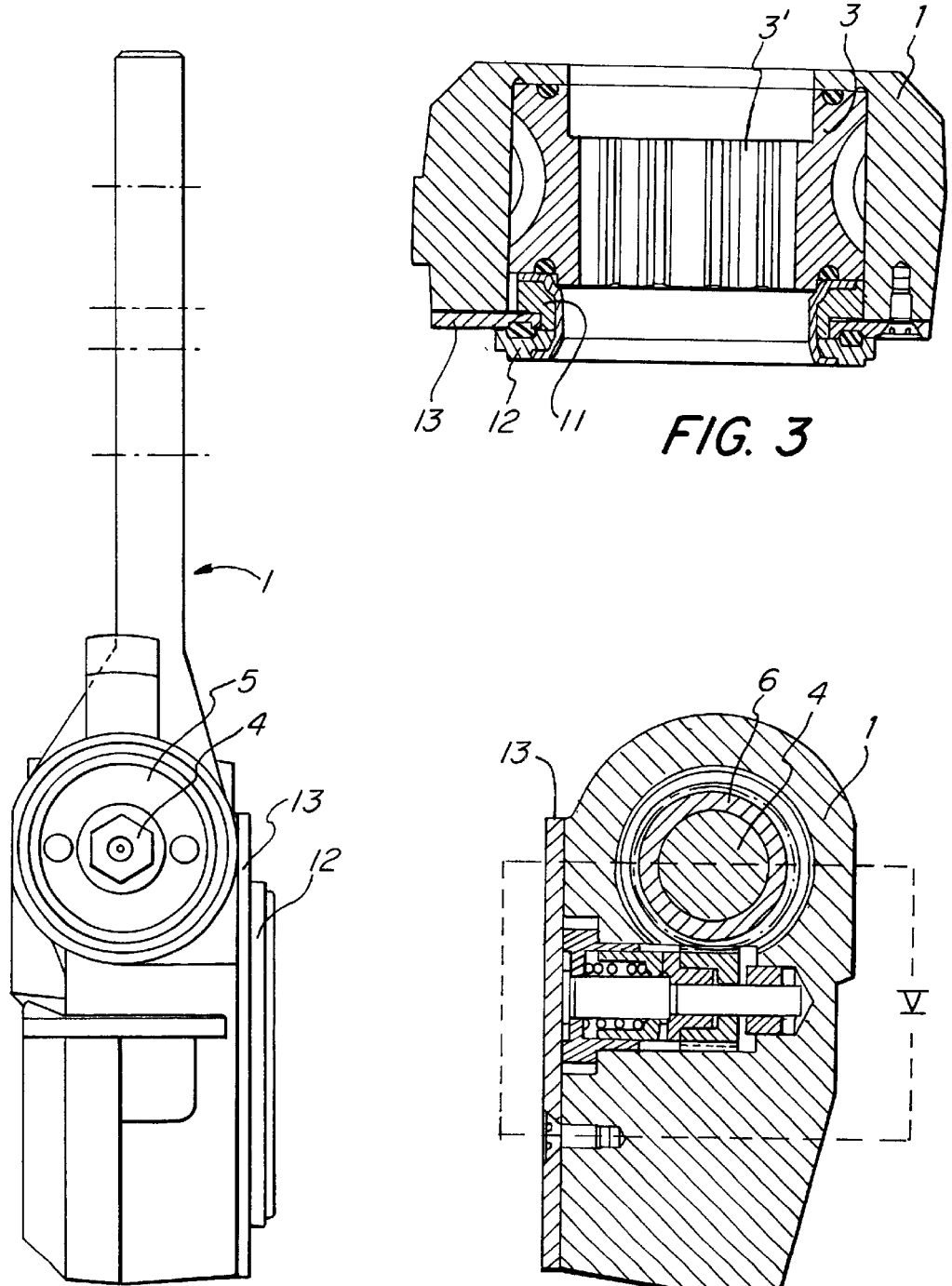
FIG. 2 is an end view of the brake lever from the left in FIG. 1.
FIG. 3 is a section to a slightly larger scale along the line III—III in FIG. 1.
FIG. 4 is a section to the same scale as FIG. 3 along the line IV—IV in FIG. 1.

The end of the worm screw 4 to the left in FIG. 1 extends out of the housing 1, and the worm screw is here provided with a hexagonal tool grip 4' (also visible in FIG. 2) for manual rotation of the screw 4. At this end there is a cover 5 threaded into the housing 1 around the screw 4. A clutch wheel 6 is rotatable on the worm screw 4 and is journalled against the cover 5. Coacting, toothed surfaces on the worm screw 4 and the clutch wheel 6 form a clutch 7. As the toothed surfaces normally are conical, the clutch is called a conical clutch 7.

The worm screw 4 is biassed to the left in FIG. 1—or in other words for engagement of the conical clutch 7—by a strong compression spring 8 arranged between a spring washer 9 at the end of the worm screw 4 and a spring cover 10 threaded into the housing 1.

A control unit 11–13 is arranged in the same bore in the housing 1 as the worm wheel 3, but is not connected thereto. It has a rotatable control disc 11, which has a toothed periphery and is connected to an external control ring 12 having a control arm 12' extending therefrom. A plane cover 13 is arranged between the control disc 11 and the control ring 12 and is screwed to the housing 1 for rotatable attachment of the control unit 11–13.

The control arm 12' is to be connected to a fixed part of the chassis of the vehicle on which the lever is rockably mounted. The purpose of the control unit 11–13 is to provide a reference or control signal for the brake lever, as will be explained below.

Figure 5:
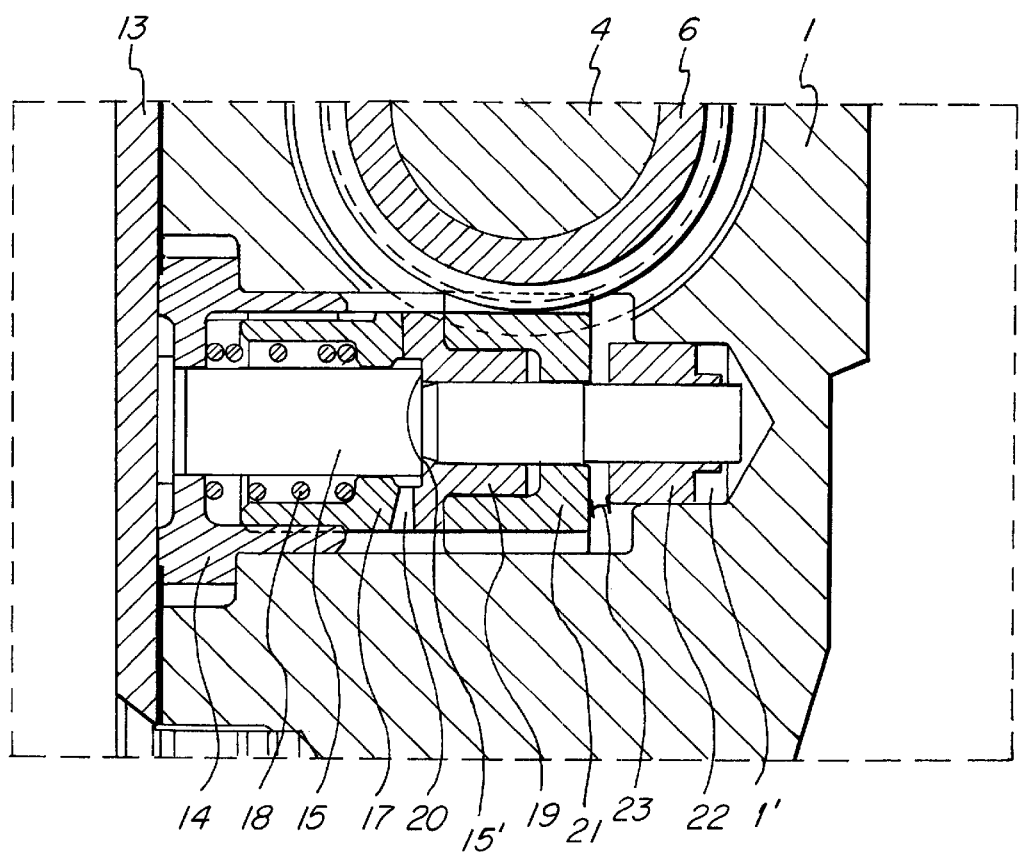
FIG. 5 is an enlargement of the area V in FIG. 4.

Meshing with the toothed control disc 11 is a pinion 14, which is rotatable in the housing 1. This pinion can be seen in FIG. 4 but best in FIG. 5, to which further reference is made. The pinion 14 is rotatably arranged on a shaft 15, which itself is rotatable in the housing 1. The pinion 14 is sleeve-shaped and receives a cylindrical driver 17, which is slidable on the shaft 15 and is in such engagement with the pinion sleeve by means of axial ridges and grooves that only relative axial movements therebetween are permitted. A compression spring 18 between the pinion 14 and the driver 17 biases the driver to the right in FIG. 5.

A tooth washer 19 is movably arranged on the shaft 15 to the right of the driver 17. Toothed surfaces facing each other on the driver 17 and the tooth washer 19 together form a one-way clutch 20, which is shown engaged in FIG. 5. The tooth washer 19 is supported to the left in the drawing by a shoulder 15' on the shaft 15.

An adjustment screw 21 in engagement with the clutch wheel 6 on the worm screw 4 is attached to the tooth washer 19 for movement therewith as a unit. It is also possible as a modification to combine the adjustment screw and the tooth washer to one single part.

At its end to the right in the drawing the shaft 15 is supported in a housing bore 1' by means of a counter-nut 22, which is threaded on the shaft 15. A control distance or A-measure 23 for the brake lever is defined between surfaces facing each other of the adjustment screw 21 and the counter-nut 22. This control distance may readily be adjusted by rotation of the counter-nut 22 on the shaft 15. When the control distance has been set, the position of the counter-nut 22 on the shaft 15 is permanented in any suitable way for preventing vibrations emanating from the operation of the vehicle from inadvertently changing the set control distance.

The unit consisting of the the tooth washer 19 and the adjustment screw 21 is movable on the shaft 15 between the limits set by the shaft shoulder 15' and the counter-nut 22.

As a modification the counter-nut 22 could be fixed on the shaft 15, and the desired control distance 23 could be obtained by substituting one nut 22 with another one with a different length.

The purpose of a brake lever of the kind concerned is to transmit the brake force from the brake cylinder to the S-cam shaft of the brake but also—with the help of the described device in the brake lever—to adjust the slack between the brake drum and the brake shoes to a desired value.

The function of the brake lever with the built-in slack adjuster according to the invention will now be described. The slack is supposed to be excessive. Initially, the different parts are in the positions shown in the drawings, especially in FIG. 5.

At the very first part of a brake application movement to the left in FIG. 1, the pinion 14 rolls on the control disc 11. The rotational movement is transmitted to the adjustment screw 21, which due to its oblique engagement with the clutch wheel 6 will move axially to the right in FIG. 5 into engagement with the counter-nut 22, so that the control distance or A-measure 23 is passed.

When this distance has been passed, the adjustment screw 21 is prevented from further rotation, whereas the pinion 14 continues to rotate, so that the one-way clutch begins to open.

In the next stage the brake shoes engage the brake drum, so that the counterforce increases and the worm screw 4 moves axially under compression of the compression spring 8, which means that the conical clutch 7 is disengaged.

The rotational resistance for the clutch wheel 6 is hereby greatly decreased, so that it can be rotated by the adjustment screw 21 without driving the worm screw at the continued brake application, until the movement of the brake lever ends.

In the beginning of the brake release, which is the so called elasticity stroke, the conical clutch 7 is open. The conical clutch 7 engages, when the force decreases, i e in principle when the brake shoes leave their engagement with the brake drum. At the further release stroke the adjustment screw 21 is transferred by the clutch wheel 6 into contact with the shaft shoulder 15'. The position shown in FIG. 5 has hereby been reestablished.

At a continued brake release stroke until its end the clutch wheel 6 will be rotated by the adjustment screw 21, so that the S-cam shaft is rotated via the conical clutch 7, the worm screw 4 and the worm wheel 3. The excessive slack between the brake shoes and the brake drum has hereby been reduced.

The above description of the function presupposes that the slack is excessive. If that is not the case, the brake application is virtually the same with the important to difference that during the brake release stroke the adjustment screw 21 engages the shaft shoulder 15' concurrently with the end of the brake release stroke.

As a modification of the design described above under reference to FIGS. 1–5, the counter-nut 22 may—after establishment of the desired control distance or A-measure 23—be fixedly attached to the shaft 15, for example by welding. In this case no thread engagement is necessary. Also, in the design described the tooth washer 19 is supported to the left by the shaft shoulder 15', whereas in a modified design the tooth washer 19 is freely movable on the shaft 15 and the adjustment screw 21 is supported by the shaft shoulder 15' (which in such a case is further to the right in FIG. 5).

What is claimed is:

1. A brake lever for attachment to a splined S-cam shaft of an automotive drum brake and connection to a brake cylinder push rod, including a worm wheel, rotatably mounted in a housing of the brake lever and having internal splines for cooperation with S-cam shaft, and a worm screw, rotatable in the housing perpendicularly to the worm wheel and meshing therewith, and a control arrangement for transmitting a control movement from a reference point to a clutch wheel, which is rotatable on the worm screw, depending on the angular movement of the brake lever, and which forms a clutch with the worm screw normally held engaged by a strong compression spring, the control arrangement including a control disc, which is rotatable coaxially with the worm wheel and is connected to a control ring having a control arm for establishing the point reference by being attached to a fixed part of a vehicle chassis, a pinion meshing with the toothed periphery of the control disc and an adjustment screw, which is coaxial with the pinion and is in toothed engagement with the clutch wheel, wherein the axis of the worm screw is perpendicular to the axis of the pinion and the adjuster screw, characterized in that a cylindrical driver is axially but non-rotatably movable in relation to the pinion coaxial therewith and forms a one-way clutch with a unit including the adjustment screw, which is axially movable a distance corresponding to a control distance for the brake lever, the one-way clutch being spring-biassed into engagement.

2. A brake lever according to claim 1, characterized in that the pinion the driver, and the unit including the adjustment screw are rotatably arranged on a common shaft.

3. A brake lever according to claim 1, characterized in that the pinion is sleeve-shaped and receives the driver and in that a compression spring arranged between the pinion and the driver.

4. A brake lever according to claim 1, characterized in that the one-way clutch is formed between the driver and a toothed washer connected to the adjustment screw.

5. A brake lever according to claim 4, characterized in that the adjustment screw is axially movable on a shaft between a shaft shoulder and a counter-nut attached at one end of the shaft.

6. A brake lever according to claim 5, characterized in that the counter-nut is arranged in a bore in the lever housing for journalling the shaft.

* * * * *